Feb. 15, 1966  T. E. MAILS  3,235,875
DATE-TIME METER
Filed March 10, 1964  3 Sheets-Sheet 1
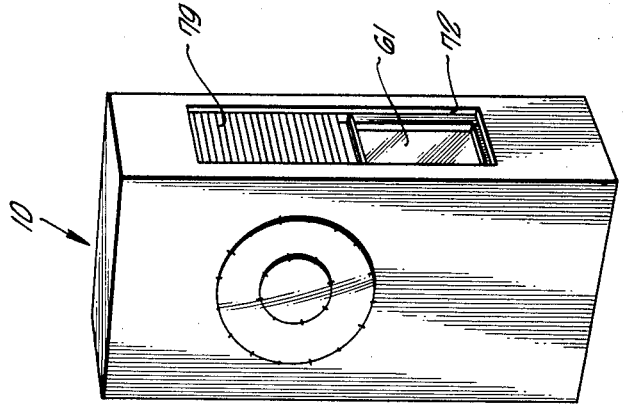
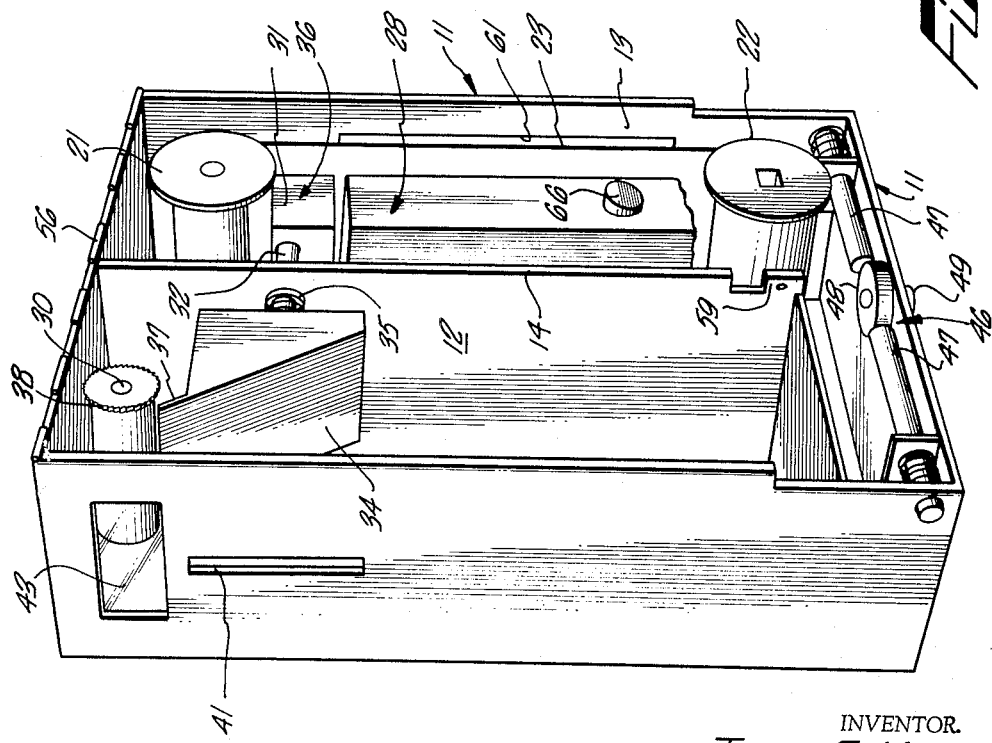
INVENTOR.
THOMAS E. MAILS
BY
Fowler, Knobbe & Gambrell
ATTORNEYS Feb. 15, 1966   T. E. MAILS   3,235,875
DATE-TIME METER
Filed March 10, 1964   3 Sheets-Sheet 2
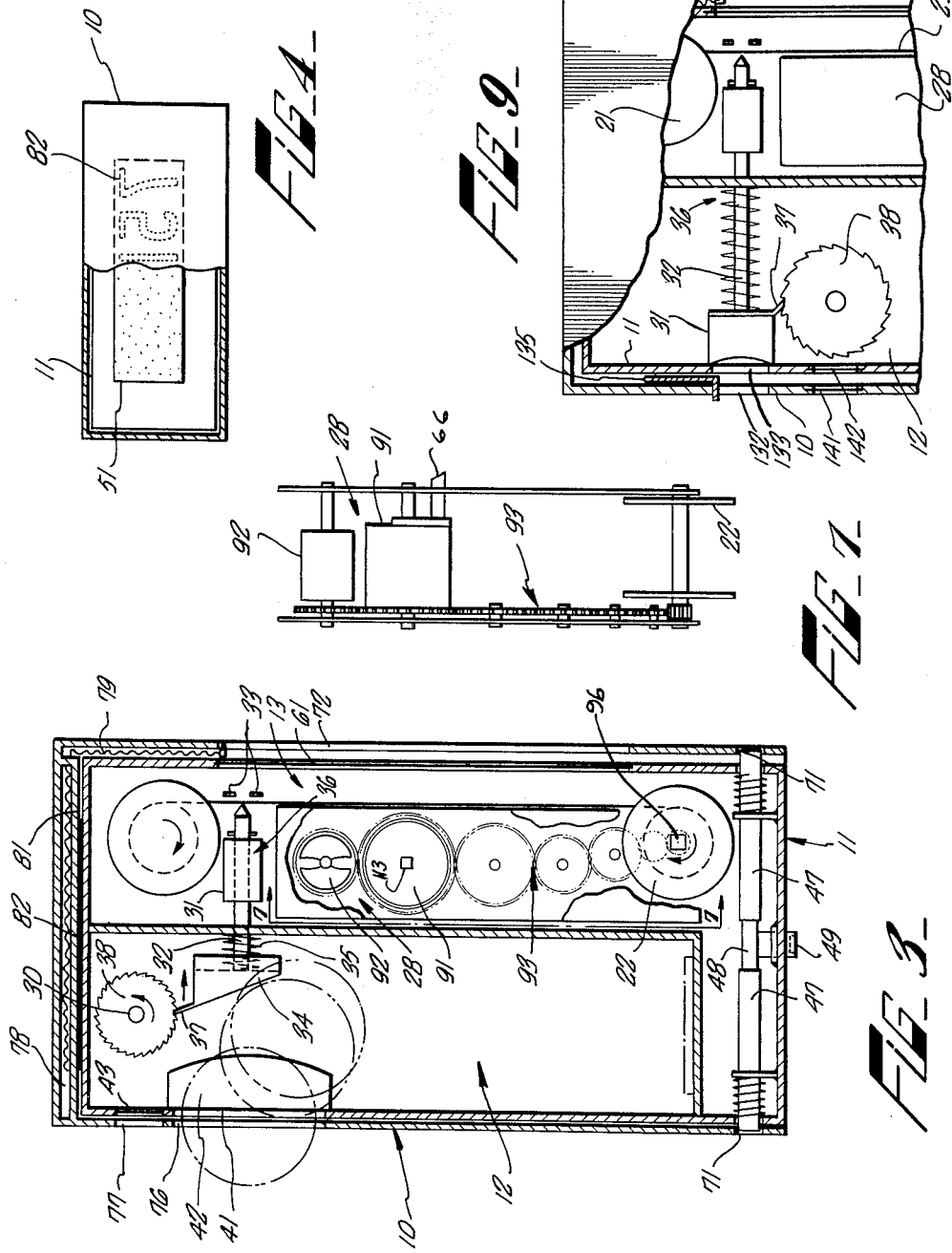
INVENTOR.
THOMAS E. MAILS
BY
Fowler, Knobbe & Gambrell
ATTORNEYS.

Feb. 15, 1966    T. E. MAILS    3,235,875
DATE-TIME METER
Filed March 10, 1964    3 Sheets-Sheet 3

INVENTOR.
THOMAS E. MAILS
BY
Fowler, Knobbe & Martens
ATTORNEYS

United States Patent Office 3,235,875
Patented Feb. 15, 1966

3,235,875
DATE-TIME METER
Thomas Elmer Mails, 395 San Bernardino Ave.,
Pomona, Calif.
Filed Mar. 10, 1964, Ser. No. 350,879
15 Claims. (Cl. 346—93)

This invention relates to meters, and more particularly to meters for use with a system for providing insurance protection for preselected periods of time.

Many efforts have been made in the past to devise insurance systems which would provide short-term coverage for intervals selected by a policyholder freely responsive to his individual needs. One of the continuing difficulties in devising such plans has been the developmnet of a satisfactory meter to be used in conjunction with it. One is needed which will be easy and convenient to use and, at the same time, sufficiently rugged and fool-proof to provide reasonable protection for the company utilizing it in a comprehensive insurance program.

The date-time meter forming the present invention may be understood more easily if we brieflly summarize the type of insurance program that will utilize it. The present invention will be used with an insurance program which provides a fixed amount of life insurance for a specified interval or period of time selected by the policyholder at will, e.g., while travelling on freeways, flying in aircraft and the like. Each policyholder will be issued a date-time meter, as described in detail hereinafter, much as an insurance policy is now issued to him. It would be usable for a preslected period, e.g., approximately forty days.

The program would be operated in conjunction with some national retail outlet, for example, a national chain of gasoline service stations. At anytime before the end of this forty-day period, the policy holder would be able to exchange the internal mechanism of the meter for a new one at any one of the service stations. Use could thereafter continue for the next forty days or less.

Whenever a policy holder wants to be insured for, say a 24-hour period, he merely inserts a coin of a preselected value in the slot provided and the meter will record the date and time of the insertion and retain the coin. During the forty-day period, whenever the policyholder wishes to select a predetermined amount of insurance for the interval of time, he need only insert a coin.

At the end of the useful life of the cartridge, which is largely determined by the running time of the motor that drives the tape recording mechanism and which can be varied, the cartridge is exchanged for another. The period is kept short enough to avoid storing too many coins in the cartridge. At an exchange location, such as a service station, the cartridge is removed from the casing and another, set to the time and date of the transfer, is placed in the casing.

The date-time meter is thereafter useful for another period up to forty days, at which time the policyholder could again exchange the cartridge at any one of the oil company's service stations.

Short-term life and casualty insurance still represents a substantial part of many insurance companies' business, and a simple and effective portable insurance program has needed a date-time meter sufficiently accurate, rugged and fool-proof to permit the policyholders to use the meter much as an insurance policy is used. The present invention means that no longer will it be necessary for collection agents to go around to the individual policyholders each week or fortnightly or monthly to make collections for the next period of insurance. Nor will it be necessary for a party to go to some specific location when he decides he wants to have insurance coverage for a short period of time. Instead, he need only take out his policy meter, insert a coin and relax for he is covered for the next 24-hour period. The decision to be covered for a period of time, therefore, is completely up to the individual and when made will not require him to call the company, go by its office, or otherwise inconvenience himself. After the cartridge has been in use 30 or 40 days, irrespective of how often coins have been inserted, the cartridge is easily exchanged for another.

The exchanged cartridge, identified by the policyholder's number as a result of its being in the meter case, is sent to the insurance company's office for the removal of coins and installation of a new tape.

The cartridge itself is sealed so that on one can undetectedly break into it before it is returned to the insurance company and, since the amount of money is relatively small in most cases, the incentive to tamper with a meter is very slight. Then too, in the event the policy holder is killed or injured during the period in which someone has improperly used or tampered with the meter-policy, the policy would be void. For the small profit possible, very few policyholders would take a chance on the amount of money in the cartridge not coinciding with the number of marks on the tape. Moreover, if a consistent pattern of shortages or evidence of tampering occurs, the company would no doubt cancel the policy.

In its broader form, the present invention includes a meter casing, a removable cartridge supported in the casing, means associated with the case to uniquely mark any cartridge placed therein, a record medium in the cartridge, and means to mark the instant time and date on the record medium.

More particularly, the novel meter constituting the present invention combines in a meter having a removable cartridge, means to seal the cartridge so that it can not be opened without detection, means to identify the casing in which any particular cartridge has been placed, a record medium in the cartridge, means to mark an instant time and date on the record medium, a counter to count the number of times the marking means is operated, and means to view the marked portion of the record medium and the counter through the meter casing.

The invention will be more fully understood when the following detailed description is read with reference to the drawings, in which:

FIG. 1 is a perspective view of the date-time meter constituting the present invention;

FIG. 2 is an enlarged perspective of a cartridge used in the instant invention with its cover removed to more clearly show the cooperating parts;

FIG. 3 is a side cross-section of the date-time meter forming the present invention;

FIG. 4 is an end view of the date-time meter of the present invention with certain parts broken away to show more clearly the means which uniquely identify the cartridge placed in a casing;

FIG. 7 is a side cross-section taken along line 7—7 of FIG. 3 to ilustrate an exemplary motor for driving the tape mechanism of the present invention;

FIG. 9 is a partial side cross-section of an alternative embodiment of the date-time meter of the present invention to illustrate a marking mechanism actuated without using coins.

Figure 5:
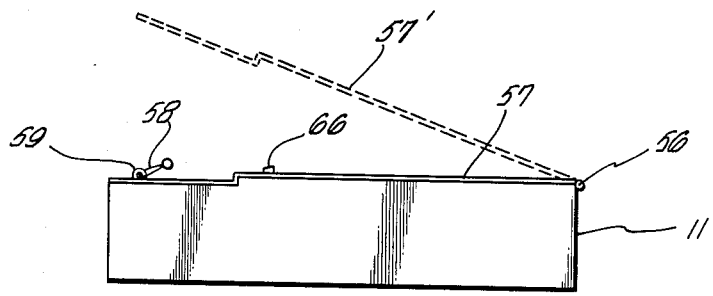
FIG. 5 is a side view of the cartridge with its hanged cover closed, and by dotted lines shown in its open position.
Figure 6:
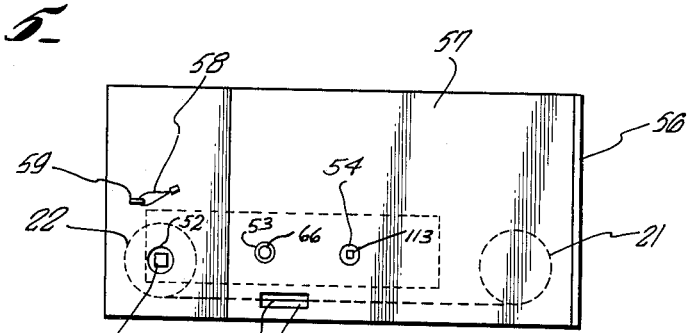
FIG. 6 is a plan view of the cartridge illustrated in FIG. 5 showing the general relationship between the supply and take-up reels of the tape mechanism and the cover apertures through which the cartridge is "set" at a service station preparatory to inserting it into a casing for use.

The date-time meter of the present invention basically comprises an outer casing 10 and a cartridge 11 inserted therein. The cartridge 11 has a pair of longitudinally oriented compartments 12 and 13 formed by a partition 14. Most of the operating parts, e.g., drive means, record medium and mechanism and the like, are supported in compartment 13, whereas compartment 12 acts primarily as a coin-holder.

Figure 8:
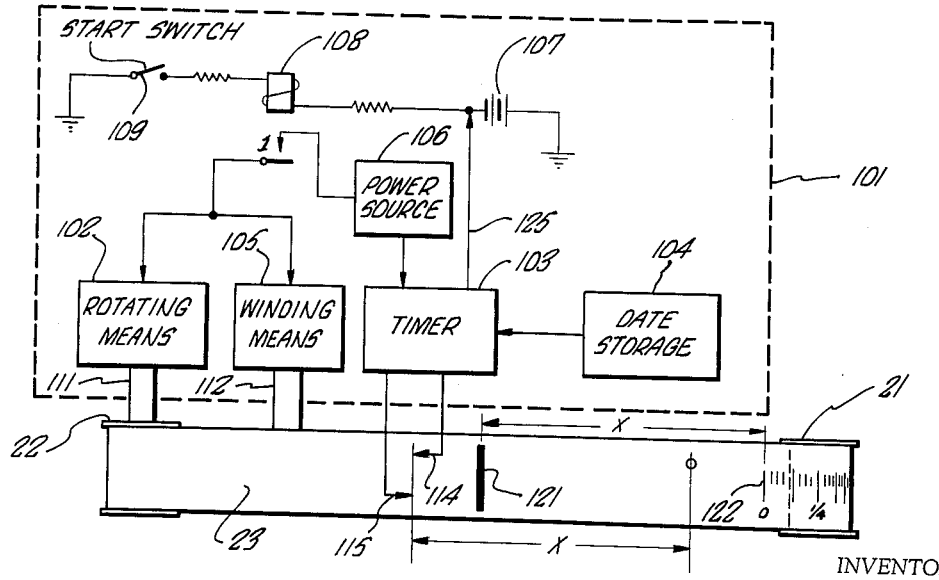
FIG. 8 is a schematic representation of a device for winding the exemplary motor of the tape-driven mechanism and setting the tape to an instant time and date.

A typical cartridge 11 includes in the compartment 13, a record medium including a rotatably supported supply reel 21, a take-up reel 22 and a tape 23 supported between them, which tape is marked at set intervals (as particularly shown in FIG. 8). The markings correspond to the hours and days of the month and the interval between them is determined by the speed of the tape. Thus a lineal movement of one interval of tape is equivalent to the passage of a preselected interval of time.

The cartridge 11 has a rectangular aperture 61 formed in the outer side of compartment 13 through which a portion of the tape 23 disposed between reels 21 and 22 may be viewed.

Motor means 28 in compartment 13 are associated with take-up reel 22 to drive it at the predetermined speed synchronized with the markings on the tape 23, as mentioned above.

A switch 66, shown particularly in FIG. 5, is associated with motor 28. This switch 66 is biased outwardly and, when the cartridge 11 is telescoped interior of the casing 10, is actuated to start the motor 28.

Beyond the tape mechanism and the motor 28 therefor, the compartment 13 houses the tape marking mechanism 36 including a support 31 for shaft 32 which is slideable transverse to the direction of the movement of the tape 23 to mark the tape. In the exemplary embodiment, the tape 23 is perforated between a pair of tape retaining fingers 33 disposed adjacent the outer face of the tape 23 on either side of the marking mechanism 36. The shaft 32 extends through the partition or wall 14 and has attached to its other end, a coin depressor 34, which is urged by spring 35 to hold shaft 32 away from the surface of tape 23 (as particularly illustrated in FIG. 3), except when actuated by the insertion of a coin. The depressor 34 also has a projecting edge 37 on one side to actuate a counter 38.

The counter 38 is rotatably supported in compartment 12 so that each transverse movement of the punch mechanism 36 causes the counter 38 to step one unit. The outer surface of the counter 38 is divided into units whereby each movement of the punch permits the counter to register the number of times it has been rotated.

The punch mechanism 36 is actuated by the insertion of a coin through a slot 41 formed in the outer side of the compartment 12. A pair of guides 42 for coins are provided on either side of the slot 41—to prevent the coins from turning sideways and not actuating the marking mechanism 36 each time.

A view window 43 is provided in the wall of compartment 13 adjacent the counter 38 to permit it to be viewed from an external position.

The cartridge 11 also includes a locking mechanism 46 which includes a pair of inwardly biased rods 47 which are movable outwardly beyond the sides of the cartridge 11 by rotation of a cam 48 affixed to a shaft 49, which shaft is journaled in one end of the cartridge 11. When the rods 47 are moved outwardly of the cartridge body 11, as depicted in FIG. 3, they will engage apertures 71 formed in the interior surfaces of the casing 10 since the apertures 71 and the ends of rods 47 are in registration.

Also formed on an end of the cartridge, but opposite the locking mechanism 46—the upper end of the cartridge as illustrated in FIG. 2 of the drawings—is an impressionable area or sticker 51 (shown particularly in FIG. 4). When the raised letters 82 are formed on the interior surface of the case 10, there is provided a unique identification of the particular cartridge carried by the case.

This impressionable material 51 may be a piece of plastic tape which is deformable by raised metal letters, a carbon-type paper which permits the identifying mark to be impressed thereon, or any other means by which a cartridge 11 may be related to the case 10 in which it had been placed after it is removed therefrom. The purpose of this is to provide means for identifying the policyholder who has used a particular cartridge when it is opened at the insurance company's office if it is found to be short a number of coins, as shown by the counter or by perforations on the tape, or if there is evidence that the cartridge has been tampered with.

The cartridge 11 has a hinge 56 affixed along its upper top side to support the cover 57, which is shown in situ in FIG. 5. The cover 57 is stepped so that when it is in place on top of the cartridge 11, a seal 58 may be threaded through an upstanding apertured shoulder 59 forming an integral part of partition 14 to prevent the cartridge 11 from being opened until it is returned to the insurance office without making the fact known. The step permits the seal 58 to lie flat so that the cartridge 11 can easily slide interior of the casing 10.

The cover 57 has apertures 52, 53, 54 and rectangular slot 118 formed therethrough so that the cartridge 11 can be "set" before insertion in casing 10, as hereinafter explained.

Turning to the outer casing or cover 10 of the date-time meter, it is generally rectangular in shape with one end open. It is proportioned to receive a cartridge 11, as illustrated particularly in FIGS. 3 and 4. After the cartridge 11 has been telescoped interior of the casing 10, the locking mechanism 46 is actuated to force the rods 47 interior of the apertures 71 formed in opposite interior sides of the casing 10. When the cartridge 11 is properly disposed in the casing 10, there is provided a view window 72 along the front side of the casing in registration with the view window 61 in the cartridge 11 so that the policyholder can tell whether the insertion of a coin has caused the tape to be marked by the marking mechanism 36.

A view window 77 is also provided in immediate registration with the view window 43 of the cartridge to permit visual inspection of the counter 38, and a coin slot 76 is provided in the side of the casing 10 which is in registration with slot 41 in the cartridge 11.

At the closed end of the casing 10, there is provided a channel 78 in which a slideable corrugated-type cover 79 is disposed. The cover 79 is slideable along the front side of the casing 10 to cover the view window 61 when the date-time meter is not in use.

There is also provided, as heretofore explained, a unique series of numbers and letters 82 formed on the interior surface 81 of the end of the casing 10. These numbers can correspond to the number of the user's policy. When the cartridge 11 is telescoped interior of the casing 10, the raised letters bear against the impressionable tape 51 and transfer the policy number to the cartridge 11 inserted therein.

Considering briefly the motor 28, which is used to drive the tape mechanism of the present invention, it can be a more or less conventional clock-spring type. As illustrated in FIGS. 3 and 7, the motor 28 can include a helical clock spring mechanism 91 which is regulated by an idler or flywheel 92 disposed on one side in parallel relation. The spring mechanism, in addition to driving the governor or flywheel 92, drives the take-up reel 22 through a gear reduction cluster 93. The gear reduction cluster is selected to provide the proper speed for tape 23. It should be obvious, of course, that the motor per se forms no part of the present invention. The spring-powered motor is merely one of a number which might be used to drive the tape machanism. It does permit good regulation to be obtained simply without electronic components, power supplies and the like.

FIG. 8 is a schematic representation of exemplary means to "set" a cartridge before it is placed in a casing. The apparatus 101 includes a tape reel rotating means 102, a timer 103, a date-storage device 104, a spring winding means 105, a power source 106, a battery 107, a relay 108, and a manual starting switch 109. Apparatus 101 cooperates with the take-up reel 22 and the tape 23. The cartridge 11 is placed in the apparatus 101 with the shaft 111 of the rotating means 102 depending into a square slot 96 in the top of take-up reel 22, the winding shaft 112 engaging cavity 113 in the motor 28, and the two sensor contacts 114 and 115 associated with the timer 103 depending through the rectangular aperture 118 in the cover 57 to bear against the front surface of the tape 23.

There is provided on the leader of tape 23, a conductive strip of material 121 which is linearly disposed a distance "x" from the zero time and date mark 122. A similar displacement of "x" distance is provided between the horizontal location of the sensor contacts 114 and 115 and the point of contact of the marking mechanism 36.

With the arrangement as shown, closure of the starting switch 109 energizes relay 108 and causes it to complete a circuit by way of contact 1 to the rotating means 102 and the winding means 105. At this point, the timer 103 is energized to time out a linear movement of the tape corresponding to the instant time and date of the month, which data was received from date storage 104. The timer 103 is set to stop the tape 23 when the marker 36 is adjacent the right hour and date. At the end of this preselected timing period, a ground is applied by way of lead 125 to relay 108 causing it to open, which stops the operation of the rotating and winding means. At this point, the tape marker 36 is opposite the exact time and date of the month.

Winding means 105 has fully wound the spring of motor 28 while the rotating means 102 rotated the tape reel 22. Once the spring is fully wound, the winding means 105 runs free until stopped by the opening of the path to power source 106.

While the circuit and machine to "set" a cartridge before it is placed in a casing are not disclosed in detail, it should be appparent that their parts are standard and per se form no part of the invention. Other arrangements may be provided to "set" the date and wind the motor 28. The means illustrated is however, simple and straight-forward in purpose.

After a cartridge has been "set" and the cartridge 11 locked in its case 10, the operation of the meter is as follows: The policyholder carries the compact unit in his briefcase, glove compartment or the like. Whenever he wants to be insured for the next 24 hours, he deposits a coin in the slot which perforates the tape at the instant hour and date. At the end of the 24-hour period, he is no longer insured. At any time, however, he can again deposit a coin to be insured. In all cases, the counter 38 which tells him how many units of insurance he has purchased and the tape view window 61 will permit him to be sure the motor 28 is moving the tape at a speed corresponding to an instant time and date. Whenever the meter is not in use, the cover 79 is closed and, because the motor is rigidly constructed of steel or some other strong material, it will be substantially impervious to dropping, fire, water, etc. Toward the end of the 40-day period, the meter will be taken to a service station and the cartridge exchanged.

In the modification of the date-time meter illustrated in FIG. 9, a button or punch 131 replaces the coin depressor 34, and the coin slots are replaced by apertures 132 and 133, formed in the casing and cartridge, respectively, to permit a user to actuate it. Also, the counter 38 is repositioned in the middle part of compartment 12 since there is no need to provide space for coin storage.

The number of units on the counter can be read through registered windows 141 and 142 so that the policyholder can keep track of the number of units of insurance he has selected during any period.

When the modified cartridge 11 is returned to the insurance company, after being turned in at a local service station, the number of units of insurance will be recorded and the policyholder billed for the amount. This modification of the meter permits it to be used in connection with more conventional insurance premium payment plans.

While the preferred embodiments of this invention are constructed of metal to resist fire and other damage, it is possibly economically advantageous to use a heavy plastic and, without determining whether a policyholder had chosen to be insured for a period in which the vehicle he is riding in burns, pay all such claims. The number of cases where this will be the cause of death are statistically so small that it may be cheaper to pay them all and use lighter materials for the meters.

While the present invention has been described in preferred forms, it should be apparent that changes can be made by those skilled in the art without departing from the spirit and scope of the invention. What is essentially necessary is to provide a rugged, compact and dependable date-time meter as heretofore disclosed. The invention should be limited only to the extent of the appended claims.

What is claimed is:

1. A date-time meter comprising, in combination,
 a case,
 a cartridge removably supported interior of said case,
 means associated with said case to mark any cartridge replaced therein with a mark unique to said case,
 a record medium interior of said cartridge, and
 means to mark said record medium at the instant date and time.

2. A date-time meter comprising, in combination,
 a case;
 an enclosed sealed cartridge removably supported interior of said case;
 means to retain said cartridge in said case;
 a tape record medium interior of said cartridge synchronized with the current time and date;
 means operable to mark said tape record medium at the instant date and time;
 means to cumulate the number of said markings; and,
 means forming a part of said meter to permit said record medium and said cumulating means to be viewed from outside of the meter casing.

3. A date-time meter comprising, in combination,
 a case;
 a cartridge removably supported interior of said case;
 means to seal said cartridge;
 means associated with said case to mark any cartridge placed therein with a mark unique to said case;
 a record medium interior of said cartridge synchronized with the current time and date;
 means operable to mark said record medium at an instant date and time;
 means to cumulate the number of said markings; and
 means associated with said cartridge and case to permit said record medium and cumulating means to be viewed from outside of said meter.

4. A date-time meter in accordance with claim 3 wherein
 said cartridge marking means includes an impressionable label removably affixed on said cartridge that is impressed by a unique mark affixed to the registered part of said case,
 said record medium is a tape moving at a speed synchronized with the passage of time; and means to mark the record medium is actuated by the insertion of a coin in said meter.

5. A date-time meter comprising in combination,
a casing,
a cartridge removably supported interior of said casing,
means to retain said cartridge in said casing,
a tape subdivided into hours and days supported in said cartridge for movement at a rate synchronized with the time spacing thereon,
means operable to move said tape,
marking means associated with said cartridge to mark said tape,
means supported in said cartridge to count the number of actuations of said marking means,
apertures formed in the registering portions of said cartridge and casing to permit the tape counting means therein to be viewed,
means for determining whenever said cartridge has been opened, and
means associated with cooperating portions of said cartridge and said casing to transfer a unique identification symbol from said casing to said cartridge whenever the cartridge is placed interior of said casing.

6. A date-time meter in accordance with claim 5 and including cover means slideably supported by said casing to cover the view aperture in said cartridge overlying said tape.

7. A date-time meter in accordance with claim 5 wherein
said means for actuating said marking mechanism is a coin inserted in a slot formed in said casing and cartridge, and
said cartridge includes a compartment for holding said coin.

8. A date-time meter in accordance with claim 5 wherein
said means to actuate said marking mechanism and said counting means is a depressable button,
said cartridge and said casing include view windows in direct registration overlying said counter, and
including a cover for said button slidably supported interior of said casing and operable to cover said button to prevent the accidental depression thereof.

9. In a date-time meter of the type having a removable cartridge disposed inside a casing and means in the cartridge to indicate on a time synchronized tape when an externally actuated marker mechanism is operated—
means for identifying the specific casing that housed a cartridge including
an identifying plate having raised letters and numbers affixed to an interior side of the casing, and
an impressionable tape removably mounted on the side of the cartridge in registration with the plate of the casing whereby the unique identifying letters and numbers impressed on said tape identify the casing with which it had been associated.

10. A date-time meter comprising, in combination,
an open end casing having a first viewing aperture formed on one side and a second viewing aperture formed on another side,
a slideable cover supported interior of said casing for movement over said first aperture,
a removable cartridge adapted to slide into said casing to form an enclosed meter,
said cartridge including a tape mechanism for moving a record tape along the side of said cartridge which underlies said first aperture and having an aperture in registration with said first aperture,
means to move said tape at a speed correlated with units of time,
a manually actuated button,
a marking mechanism responsive to each movement of said button to mark the tape at the instant time, and
a unit counter supported in said cartridge adjacent an aperture formed therethrough that registers with said second aperture to cumulate the number of movements of said button.

11. In a data-time meter of a type which includes a mechanism to move a tape record medium having a reference mark and spaced-apart intervals marked thereon along a longitudinal path at a speed synchronized with the passage of time and which includes externally controlled means to mark the tape—means for setting the tape to the instant time and date preparatory to placing the cartridge in the casing comprising
a conductive strip affixed to one surface of the tape leader a preselected longitudinal distance from a reference mark on said tape,
a pair of sensor contacts supported to bear against said one surface of the tape at a position longitudinally spaced from the marking means by said preselected distance,
means operable to rotate the take-up reel of the tape mechanism,
means to enable said rotary means,
means responsive to the completion of a circuit path between said two contacts by way of said conductive strip to continue the rotation of said take-up reel a longitudinal distance equal to the tape interval between said reference mark and the marked interval on said tape corresponding to the instant time and date.

12. In a date-time meter of the kind having a casing supporting a removable cartridge that includes a pair of tape reels, a tape supported between the reels which has spaced-apart date and time markings on it that correlate with the time it takes for the tape to move linearly a preselected distance, a motor controlled by a clock spring operable to drive the take-up reel of the tape mechanism at the controlled speed and externally controlled means for marking the tape—
means for initially setting the cartridge by winding the motor and correlating the time markings on the tape with the instant time comprising, in combination,
rotating means adapted to engage the take-up reel;
winding means spaced apart therefrom and adapted to engage the spring of the motor;
means to energize said rotating and winding means;
timer means including a pair of spaced-apart sensor contracts that bear against the outer surface of said tape;
date storage means associated with said timer;
bridging means on the leader of said tape a reference distance from a zero time and date marking on said tape;
said timer responsive to the closure of said contacts through said bridging means to start timing out a period corresponding to the difference between date and time zero and the instant time and date as provided by said date storage means;
and means responsive to the end of said period to disable said rotating means and said winding means so that the date on the tape adjacent the tape marking means coincides with the instant date and time.

13. A coin operated date-time meter comprising, in combination,
a cartridge divided in it first and second compartments;
a rectangualr meter casing for receiving said cartridge;
means operable to lock said cartridge interior of said casing;
a date-time tape marked in hour and day subdivisons supported n said first compartment for movement at a rate synchronized with the passage of each 24-hour period marked on said tape;
motor means operable to move said tape in translation at said preselected rate;
switching means actuated by a side of said casing when it is telescoped over said cartridge to operate said motor means;

a punch mechanism supported in said cartridge operable to perforate said tape by the depression of manually actuated means;

a counter supported interior of said second compartment to count the operations of said punch mechanisms;

means operable to seal said cartridge so that it can not be opened without detection;

impressionable identifying means affixed to the outside of one end of said cartridge;

raised identifying numbers and letters formed on an interior surface of the end of said casing adjacent said identifying means;

said identifying numbers and letters being impressed on said identifying means whenever said cartridge is placed in said casing;

a view window for said tape; and, slideable covers supported by said casing to cover said view window and said manually actuated means when said meter is not in use.

14. A coin-operated date-time comprising, in combination, a rectangular-shaped cartridge divided into first and second compartments;

a tape mechanism in said first compartment having supply and take-up reels and a date-time tape, which is marked in hour and day subdivisions, supported between said reels for movement at a rate synchronizing the movement of the tape with the passage of each 24-hour period marked on said tape;

motor means operable to rotate said take-up reel to move said tape at said synchronizing rate;

a punch mechanism supported in said cartridge operable to perforate said tape by the depression of coin actuated means in said second compartment;

a counter rotatably supported interior of said second compartment to count the operations of said punch mechanism;

a slot formed in the outer side of said second compartment adjacent said coin actuating means to permit coins of preselected value and size to actuate said punching mechanism;

cover means operable to close said cartridge so that it can not be opened without detection;

a rectangular meter casing for holding said cartridge;

means operable to lock said cartridge interior of said casing;

switching means actuated by a part of said casing when it is telescoped over said cartridge to operate said motor means;

removable impressionable identifying means affixed to the outside of one end of said cartridge raised identifying numbers and letters formed on an interior surface of the end of said casing adjacent said removable identifying means said identifying numbers and letters being impressed on said identifying means whenever said cartridge is placed in said casing; and, a view window for said tape disposed interior of said cartridge and having a slidable cover therefor.

15. A coin operated date-time meter comprising, in combination, an open top, rectangular-shaped cartridge divided into first and second longitudinal compartments, said second compartment acting as a storage space for coins deposited in said meter;

a tape mechinsm having supply and take-up reels spaced apart along an outer side of said first compartment, and a date-time tape subdivided and marked into hours and days for at least 40 consecutive days supported between said reels for movement at a rate synchronizing the movement of the tape with the passage of each 24-hour period marked on said tape;

motor means operable to rotate said take-up reel to move said tape at said preselected rate;

a glass window formed in said outer side of said first compartment to permit the said tape to be viewed therethrough;

a punch mechanism supported in said cartridge at right angles to said tape and operable to perforate said tape by the depression of a coin actuated means in said second compartment;

a ratchet-type counter wheel rotatably supported interior of said second compartment, said ratchet wheel having unit markings thereon and being rotated a unit step by each operation of said punch mechanism;

a view window in the outer side of said second compartment opposite the outer side of said first compartment through which said counter may be viewed;

a slot formed in the outer side of said second compartment adjacent said coin actuating means to permit coins of preselected value and size to actuate said punching mechanism;

a hinged cover attached to said cartridge for movement between open and closed positions;

means to seal said cover in its closed position so that it can not be opened without detection, said cover having apertures overlying said take-up reel and a portion of said tape at a preselected distance along said tape from the location of said punch mechanism to permit the instant position of said tape after said cover seal has been installed to be correlated with an instant time of day and date;

locking means supported in said cartridge transverse to the outer sides of said first and second compartments operable to extend projecting rods outwardly beyond the sides of said cartridge;

a rectangular meter casing for receiving said cartridge and having apertures formed in opposite interior surfaces of its sides to accommodate said rods of said locking means after the cartridge is interior of said casing and said locking means has been operated;

external means to operate said locking means to lock said cartridge interior of said casing;

switching means actuated by a side of said casing when it is telescoped over said cartridge to operate said motor means;

removable impressionable identifying means affixed to the outside of one end of said cartridge;

raised identifying numbers and letters formed on an interior surface of the end of said casing adjacent said removable identifying means;

said identifying numbers and letters being impressed on said identifying means whenever said cartridge is placed in said casing;

apertures formed in said casing in registration with the view windows for said counter and the outer face of said tape and said coin slot; and, a protective cover for the view window for said tape disposed interior of said casing and slidable to cover said tape view window.

References Cited by the Examiner
UNITED STATES PATENTS

| | | | |
|---|---|---|---|
| 2,029,029 | 1/1936 | Koester | 346—25 |
| 2,282,561 | 5/1942 | Callahan | 346—92 |
| 2,344,675 | 3/1944 | Burts | 346—58 |
| 2,593,593 | 4/1952 | Nielson | 346—25 |

LEO SMILOW, *Primary Examiner.*